United States Patent
Sabapathi et al.

(10) Patent No.: US 11,595,866 B2
(45) Date of Patent: Feb. 28, 2023

(54) BEAM SWITCHING FOR A MULTI-SIM USER EQUIPMENT

(71) Applicant: QUALCOMM Incorporated, San Diego, CA (US)

(72) Inventors: Karthikeyan Sabapathi, Hyderabad (IN); Praveen Peruru, San Diego, CA (US); Ramesh Pantham, Hyderabad (IN); Narendra Pulicherla, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 120 days.

(21) Appl. No.: 16/948,492

(22) Filed: Sep. 21, 2020

(65) Prior Publication Data

US 2022/0095180 A1 Mar. 24, 2022

(51) Int. Cl.
*H04W 36/00* (2009.01)
*H04W 36/30* (2009.01)
*H04W 74/08* (2009.01)
*H04W 36/06* (2009.01)
*H04W 88/06* (2009.01)

(52) U.S. Cl.
CPC ... *H04W 36/0088* (2013.01); *H04W 36/0094* (2013.01); *H04W 36/06* (2013.01); *H04W 36/305* (2018.08); *H04W 74/0833* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2014/0302865 A1* | 10/2014 | Bai | H04W 72/042 455/452.1 |
| 2019/0036224 A1* | 1/2019 | McCollough | H01Q 5/321 |
| 2021/0385707 A1* | 12/2021 | Saad | H04W 36/0079 |
| 2021/0410107 A1* | 12/2021 | Park | H04W 76/27 |
| 2022/0264383 A1* | 8/2022 | Teyeb | H04W 36/12 |

* cited by examiner

*Primary Examiner* — Mohammad S Adhami
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, a beam measurement report associated with a serving beam of the UE. The UE may determine that a timer, relative to transmission of the beam measurement report, has expired. The UE may perform a measurement of one or more neighbor beams based at least in part on determining that the timer has expired. Numerous other aspects are provided.

30 Claims, 9 Drawing Sheets

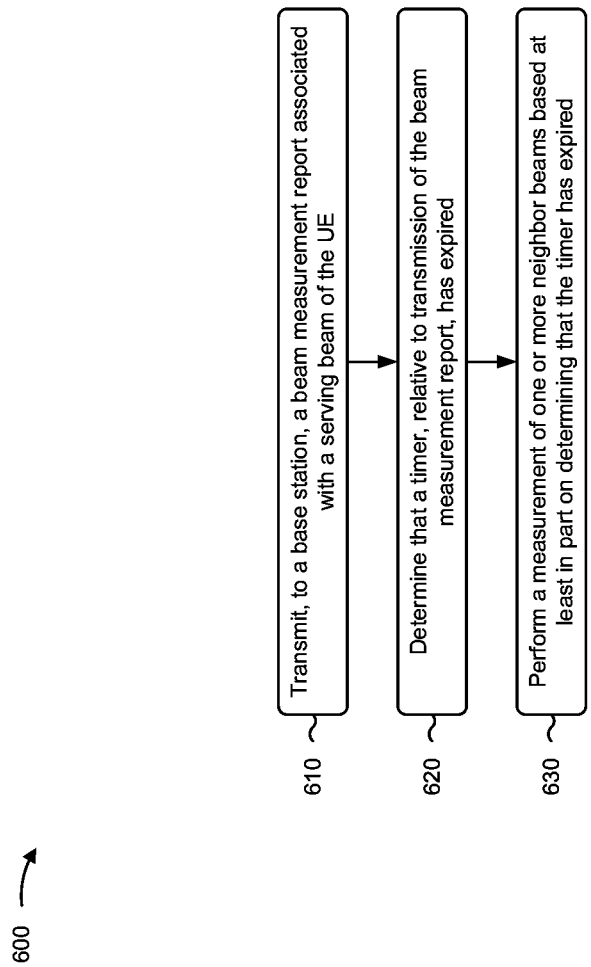

BEAM SWITCHING FOR A MULTI-SIM USER EQUIPMENT

FIELD OF THE DISCLOSURE

Aspects of the present disclosure generally relate to wireless communication and to techniques and apparatuses for beam switching for a multi-subscriber identification module (multi-SIM) user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a base station, a beam measurement report associated with a serving beam of the UE; determining that a timer, relative to transmission of the beam measurement report, has expired; and performing a measurement of one or more neighbor beams based at least in part on determining that the timer has expired.

In some aspects, a UE for wireless communication includes a memory and one or more processors operatively coupled to the memory, the memory and the one or more processors configured to: transmit, to a base station, a beam measurement report associated with a serving beam of the UE; determine that a timer, relative to transmission of the beam measurement report, has expired; and perform a measurement of one or more neighbor beams based at least in part on determining that the timer has expired.

In some aspects, a non-transitory computer-readable medium storing a set of instructions for wireless communication includes one or more instructions that, when executed by one or more processors of a UE, cause the UE to: transmit, to a base station, a beam measurement report associated with a serving beam of the UE; determine that a timer, relative to transmission of the beam measurement report, has expired; and perform a measurement of one or more neighbor beams based at least in part on determining that the timer has expired.

In some aspects, an apparatus for wireless communication includes means for transmitting, to a base station, a beam measurement report associated with a serving beam of the apparatus; means for determining that a timer, relative to transmission of the beam measurement report, has expired; and means for performing a measurement of one or more neighbor beams based at least in part on determining that the timer has expired.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

FIG. 6 is a diagram illustrating an example process associated with beam switching for a multi-SIM UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
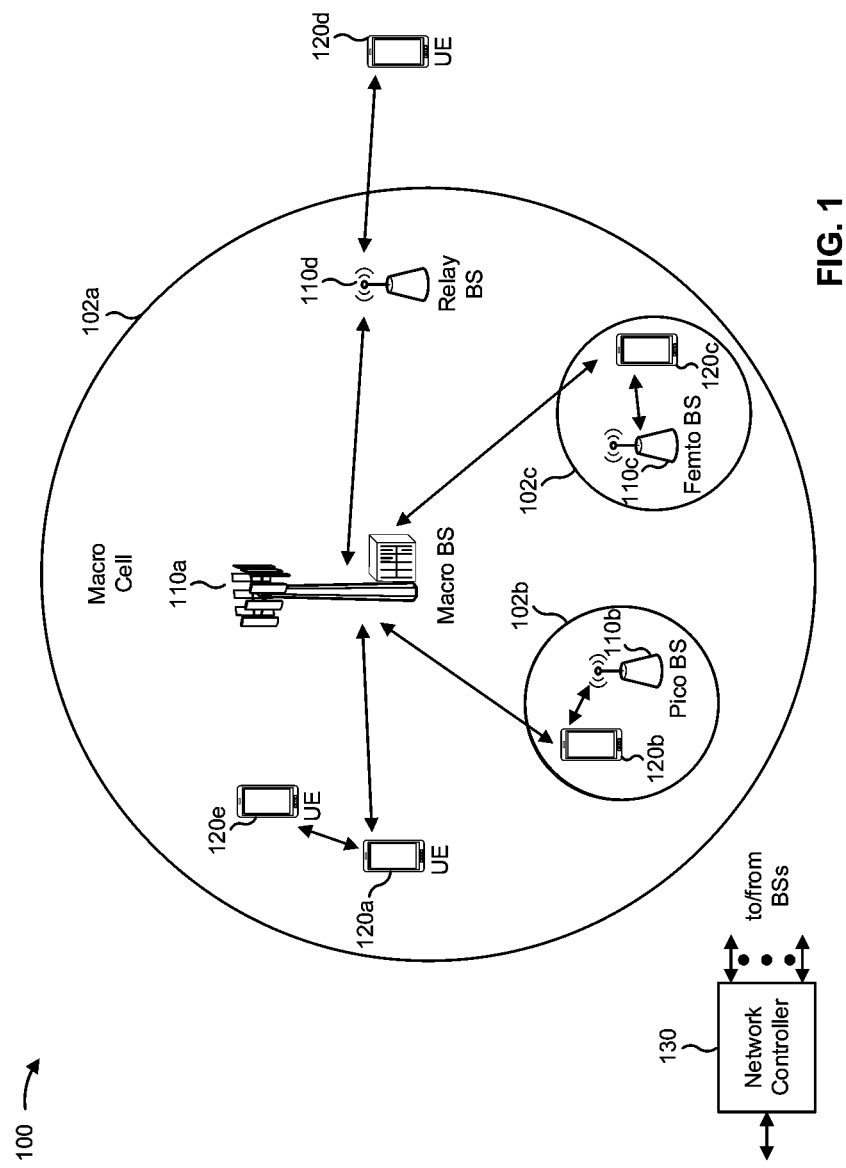
- FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
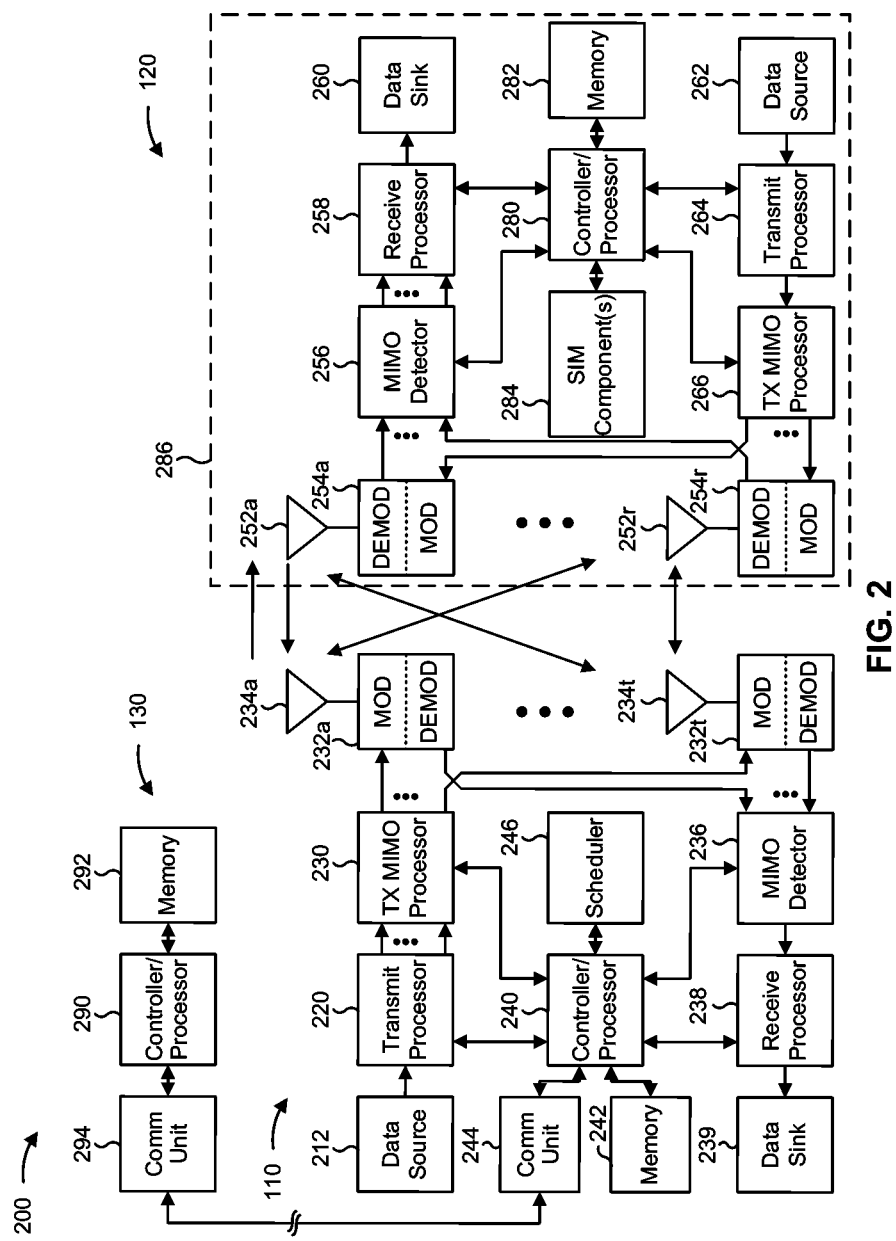
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like.

A UE 120 may include one or more subscriber identification module (SIM) components 284. SIM component 284 may be at least partially external, such as a SIM card, a universal SIM (USIM) card, and/or the like. Additionally, or alternatively, the SIM component may be at least partially integrated, such as an embedded SIM (eSIM), a universal integrated circuit card (UICC), and/or the like. The SIM component(s) 284 may store or provide user-specific data, such as a phone number, a user identifier, a device identifier, a home network identity, security information, and/or other types of user-specific data. The SIM component(s) 284 may also store subscription information associated with a wireless network subscription, such as information identifying one or more subscription services (e.g., provided by the wireless network) that are authorized to be access and used by the UE 120. In some aspects, a UE 120 may be a multiple SIM or multi-SIM device, which may be a wireless or cellular communication device that is capable of operating simultaneous subscriptions to a plurality of wireless networks. In these examples, the SIM component(s) 284 may store information for each wireless network subscription. In some aspects, one or more components of UE 120 may be included in a housing 286.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5A-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5A-6.

Controller/processor 240 of base station 110, controller/processor 280 of UE 120, and/or any other component(s) of FIG. 2 may perform one or more techniques associated with beam switching for a multi-SIM UE, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, interpreting the instructions, and/or the like.

In some aspects, UE 120 includes means for transmitting, to a base station 110, a beam measurement report associated with a serving beam of the UE 120; determining that a timer, relative to transmission of the beam measurement report, has expired; and performing a measurement of one or more neighbor beams based at least in part on determining that the timer has expired. In some aspects, the UE 120 includes means for determining that a measurement of the serving beam does not satisfy a measurement threshold and means for performing the measurement of the one or more neighbor beams based at least in part on determining that the measurement of the serving beam does not satisfy the measurement threshold.

In some aspects, the UE 120 includes means for transmitting another beam measurement report to the base station 110, wherein the other beam measurement report is associated with the measurement of the one or more neighbor beams; means for determining that a quantity of beam failure instances on the serving beam satisfies a threshold prior to expiration of another timer relative to transmission of the other beam measurement report; and means for initiating a random access channel (RACH) procedure on a neighbor beam of the one or more neighbor beams based at least in part on determining that the quantity of beam failure instances satisfies the threshold.

In some aspects, the UE 120 includes means for transmitting another beam measurement report to the base station 110, wherein the other beam measurement report is associated with the measurement of the one or more neighbor beams; and means for receiving, from the base station 110 and based at least in part on transmitting the other beam measurement report, an indication to perform a beam switch procedure to switch from the serving beam to a neighbor beam of the one or more neighbor beams.

In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
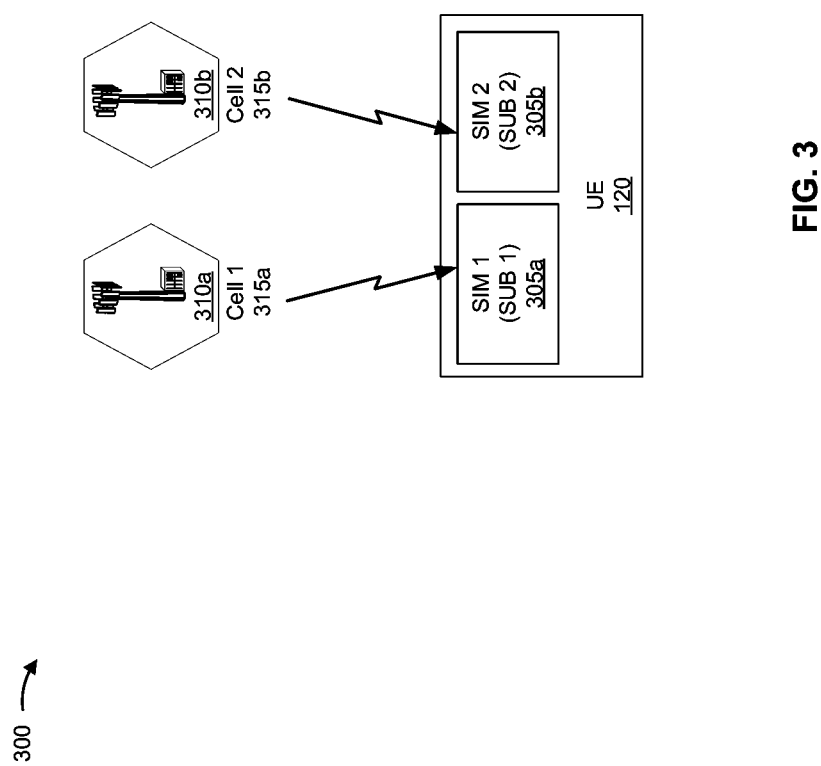
FIG. 3 is a diagram illustrating an example of a multiple subscriber identification module (multi-SIM) UE, in accordance with various aspects of the present disclosure.

FIG. 3 is a diagram illustrating an example 300 of a multi-SIM UE, in accordance with various aspects of the present disclosure. As shown in FIG. 3, a UE 120 may be a multi-SIM UE that includes multiple SIMs (two or more SIMs), shown as a first SIM 305*a* and a second SIM 305*b*. The first SIM 305*a* may be associated with a first subscription (shown as SUB 1), and the second SIM 305*b* may be associated with a second subscription (shown as SUB 2). In some aspects, the first SIM 305*a* and the second SIM 305*b* are implemented by the same SIM component 284 of the UE. In some aspects, the first SIM 305*a* and the second SIM 305*b* are implemented by separate SIM components 284 of the UE. A subscription may include a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310*a* via a first cell 315*a* (shown as Cell 1) using the first SIM 305*a*. In this case, a first subscription (SUB 1) of the UE 120 may be used to access the first cell 315*a* (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310*b* via a second cell 315*b* (shown as Cell 2) using the second SIM 305*b*. In this case, a second subscription (SUB 2) of the UE 120 may be used to access the second cell 315*b* (for example, using a second IMSI for UE identification, using a second security key for UE authentication, using a second list of services that the UE 120 is permitted to access using the second subscription, or by counting data or voice usage on the second cell against the second subscription, among other examples).

The first base station 310*a* and/or the second base station 310*b* may include one or more of the base stations 110 described above in connection with FIG. 1. Although the first cell 315*a* and the second cell 315*b* are shown as being provided by different base stations, in some aspects, the first cell 315 and the second cell 315*b* may be provided by the same base station. Thus, in some aspects, the first base station 310*a* and the second base station 310*b* may be integrated into a single base station.

In some aspects, first cell 315*a* and the first subscription operate on a different RAT than the second cell 315*b* and the second subscription. For example, the first cell 315*a* and the first subscription may operate on a 5G NR RAT in which beam-based communication may be performed between the first base station 310*a* and the UE 120, and the second cell 315*b* and the second subscription may operate on an LTE RAT, a wideband code division multiple access (W-CDMA) RAT, or another type of RAT. In some aspects, first cell 315*a* and the first subscription operate on the same RAT as the second cell 315*b* and the second subscription.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples.

As indicated above, FIG. 3 is provided as an example. Other examples may differ from what is described with regard to FIG. 3.

Figure 4:
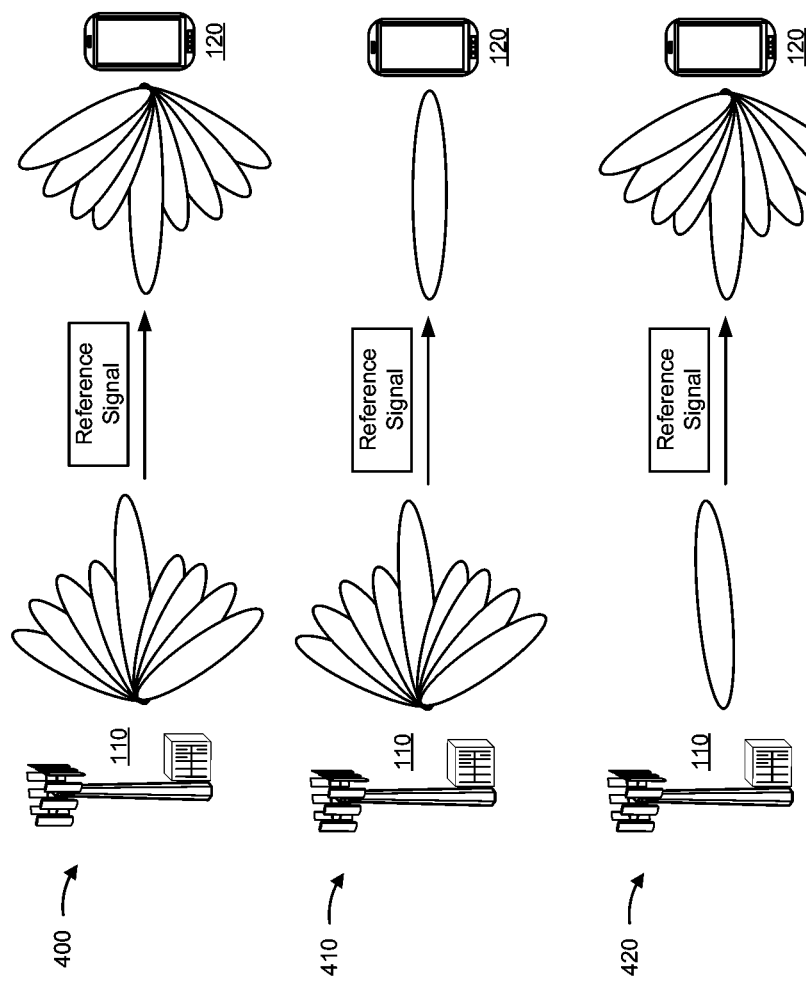
FIG. 4 is a diagram illustrating examples of beam management procedures, in accordance with various aspects of the present disclosure.

FIG. 4 is a diagram illustrating examples of beam management procedures, in accordance with various aspects of the present disclosure. In some aspects, the example beam management procedures may be used in a beam-based wireless network, such as a 5G NR wireless network or another wireless network that operates on millimeter wave (mmWave) or higher frequency bands. As shown in FIG. 4, examples 400, 410, and 420 include a UE 120 in communication with a base station 110 in a wireless network (e.g., wireless network 100). However, the devices shown in FIG.

4 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected mode and/or the like).

As shown in FIG. 4, example 400 may include a base station 110 and a UE 120 communicating to perform beam management using reference signals. The reference signals may include channel state information reference signals (CSI-RSs), demodulation reference signals (DMRSs), and/or other types of reference signals. Example 400 depicts a first beam management procedure. The first beam management procedure may be referred to as a beam selection procedure, an initial beam acquisition procedure, a beam sweeping procedure, a cell search procedure, a beam search procedure, and/or the like. As shown in FIG. 4 and example 400, a reference signal may be configured to be transmitted from the base station 110 to the UE 120. The reference signal may be configured to be periodic (e.g., using RRC signaling and/or the like), semi-persistent (e.g., using medium access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a reference signal using each transmit beam for beam management. To enable the UE 120 to perform receive (Rx) beam sweeping, the base station may use a transmit beam to transmit (e.g., with repetitions) each reference signal at multiple times within the same reference signal resource set so that the UE 120 can sweep through receive beams in multiple transmission instances. For example, if the base station 110 has a set of N transmit beams and the UE 120 has a set of M receive beams, the reference signal may be transmitted on each of the N transmit beams M times so that the UE 120 may receive M instances of the reference signal per transmit beam. In other words, for each transmit beam of the base station 110, the UE 120 may perform beam sweeping through the receive beams of the UE 120. As a result, the first beam management procedure may enable the UE 120 to measure a reference signal on different (e.g., neighboring) transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 400 has been described in connection with reference signals, the first beam management process may also use synchronization signal blocks (SSBs) and/or other types of transmissions for beam management in a similar manner as described above.

As shown in FIG. 4, example 410 may include a base station 110 and a UE 120 communicating to perform beam management using reference signals. Example 410 depicts a second beam management procedure. The second beam management procedure may be referred to as a beam refinement procedure, a base station beam refinement procedure, a TRP beam refinement procedure, a transmit beam refinement procedure, and/or the like. As shown in FIG. 4 and example 410, a reference signal may be configured to be transmitted from the base station 110 to the UE 120. The reference signal may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a reference signal using each (e.g., neighboring) transmit beam of the one or more transmit beams for beam management. The UE 120 may measure each reference signal using a single (e.g., a same) receive beam (e.g., determined based at least in part on measurements performed in connection with the first beam management procedure). The second beam management procedure may enable the base station 110 to select a best transmit beam based at least in part on measurements of the reference signal (e.g., measured by the UE 120 using the single receive beam) reported by the UE 120.

As shown in FIG. 4, example 420 depicts a third beam management procedure. The third beam management procedure may be referred to as a beam refinement procedure, a UE beam refinement procedure, a receive beam refinement procedure, and/or the like. As shown in FIG. 4 and example 420, one or more reference signals may be configured to be transmitted from the base station 110 to the UE 120. The reference signal(s) may be configured to be aperiodic (e.g., using DCI and/or the like). The third beam management process may include the base station 110 transmitting the one or more reference signals using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) a reference signal at multiple times within the same reference signal resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the reference signal of the transmit beam using the one or more receive beams).

As indicated above, FIG. 4 is provided as an example of beam management procedures. Other examples of beam management procedures may differ from what is described with respect to FIG. 4. For example, the UE 120 and the base station 110 may perform the third beam management procedure before performing the second beam management procedure, the UE 120 and the base station 110 may perform a similar beam management procedure to select a UE transmit beam, and/or the like.

In some cases, a UE may experience poor and/or worsening channel conditions on a wireless network subscription. For example, on a beam-based subscription (such as a subscription on a 5G NR RAT or another beam-based RAT), the UE may be moving away from the spatial coverage area of the serving beam or an obstruction may be at least partially blocking the serving beam. In these cases, the UE may transmit a beam measurement report to the serving base station to indicate the channel conditions to the base station. The base station may receive the beam measurement report and may provide an indication to the UE to perform measurement of neighbor beams (e.g., other beams provided by the base station). The UE may perform the measurement of the neighbor beams and may provide results of the measurements to the base station, which may instruct the UE to switch to a neighbor beam based at least in part on the measurement report.

In cases where a UE is a multi-SIM UE, resources of a modem of the UE may be shared between a plurality of wireless network subscriptions of the UE. The UE may switch between processing a first subscription using the resources of the modem (e.g., the radio and/or baseband resources of the modem) and processing a second subscription using the resources of the modem.

As a result of resource sharing of the modem of the UE, there may be cases where the UE misses or cannot receive an indication to perform measurement of neighbor beams where the UE is experiencing poor and/or worsening conditions on a serving beam of a wireless network subscription. For example, the UE may need to perform a tune-away of the modem from a first subscription to a second subscription, where the resources of the modem are switched to the second subscription to process high priority activity (e.g., a voice call, short message service (SMS) content, and/or multimedia message service (MMS) content) or to mitigate poor and/or worsening channel conditions for the second subscription. During the tune-away of the modem from the first subscription to the second subscription, the modem is unable to receive and/or process communications for the first subscription. As a result, the UE may not receive an instruction to perform measurement of neighbor beams for the first subscription during the tune-away, which can cause a delay in beam switching for the first subscription (which can result in poor and/or worsening quality of service (QoS), reduce throughput, and/or increase delay, among other examples) and/or can cause a radio link failure on the first subscription.

Some aspects described herein provide techniques for beam switching for a multi-SIM UE. In some aspects, a UE (e.g., a UE 120) may initiate a timer after transmitting a beam measurement report to a base station for a serving beam for a first subscription of the UE. If a tune-away of the modem of the UE to a second subscription is performed during countdown of the timer, the UE may automatically perform a measurement of one or more neighbor beams to mitigate poor or worsening channel conditions on the serving beam if the UE does not receive an indication from the base station prior to expiration of the timer to perform the measurement.

In this way, the UE may transmit another beam measurement report to the base station for the measurement of the one or more neighbor beams even in cases where the UE misses or cannot receive the indication to perform the measurement. This enables the base station to identify a neighbor beam of the UE to which to switch from the serving beam to increase channel quality on the first subscription and/or to reduce the likelihood of a radio link failure for the first subscription. Moreover, the UE is enabled to automatically switch to a neighbor beam of the one or more neighbor beams if the UE does not receive a response from the base station after transmitting the measurement report for the one or more neighbor beams, which further reduces the likelihood of a radio link failure for the first subscription.

Figure 5A:
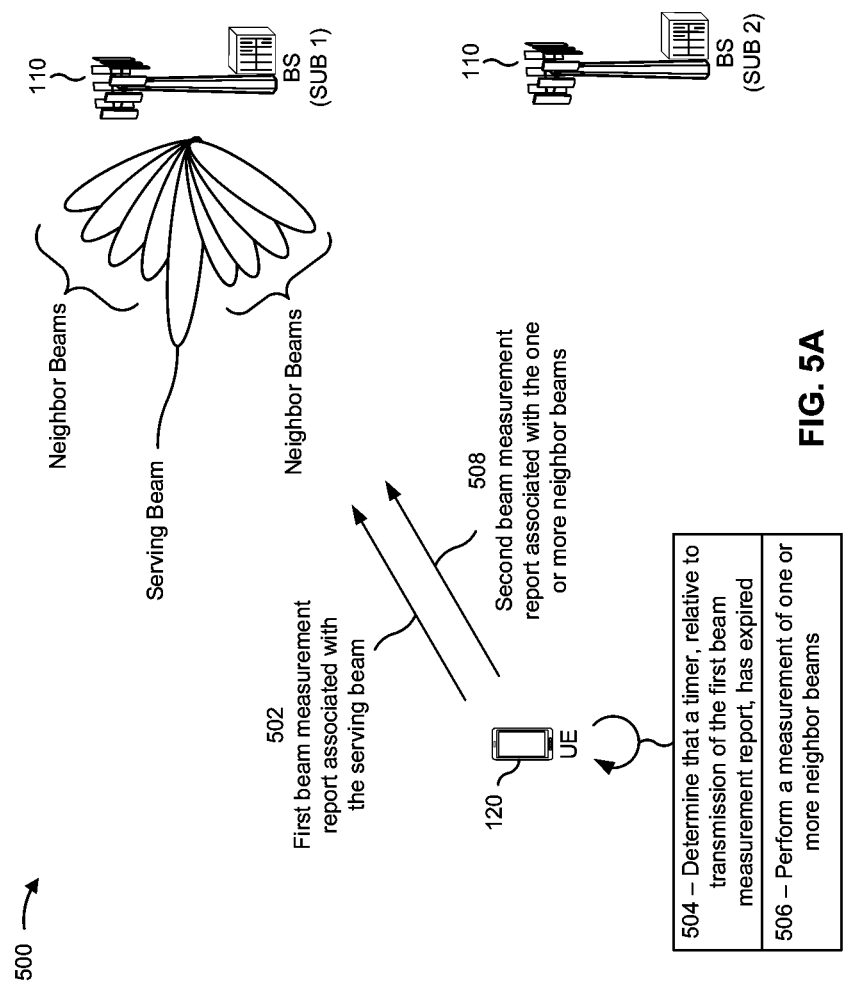
FIGS. 5A-5C are diagrams illustrating one or more examples associated with beam switching for a multi-SIM UE, in accordance with various aspects of the present disclosure.
Figure 5B:
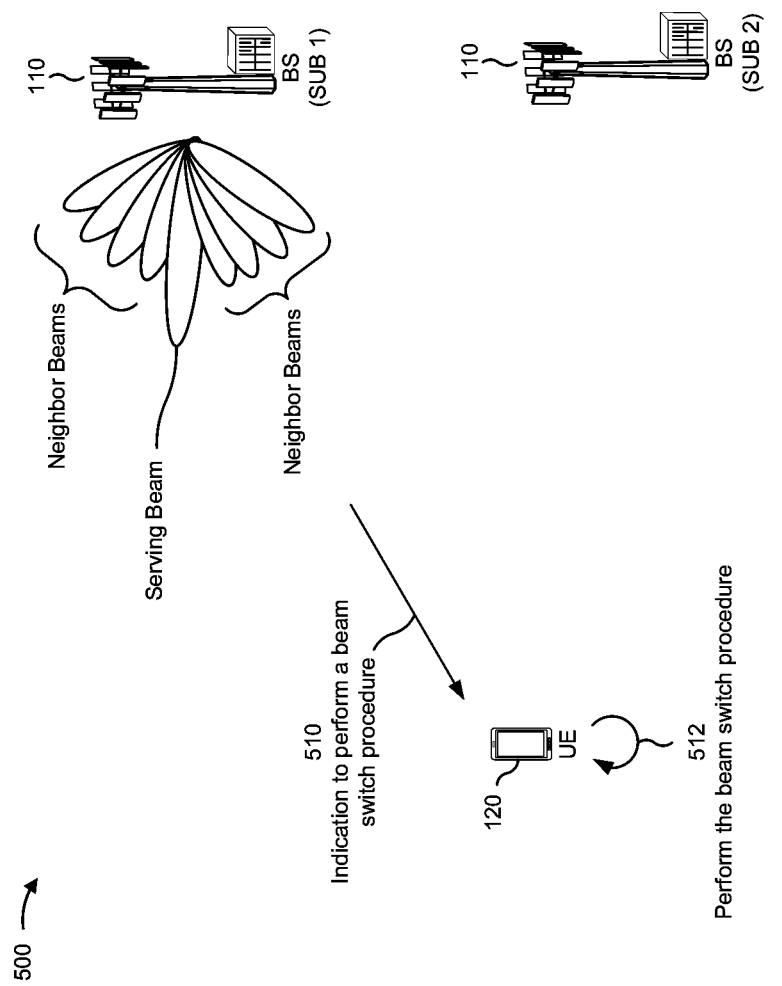
Figure 5C:
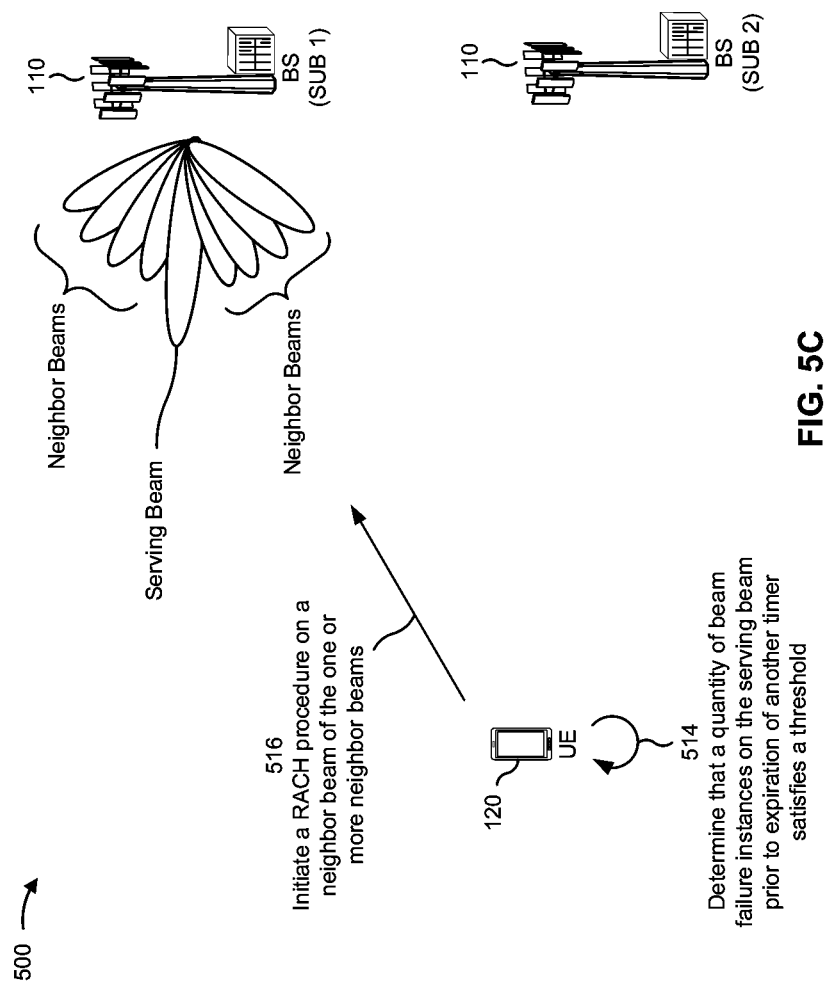

FIGS. 5A-5C are diagrams illustrating one or more examples 500 associated with beam switching for a multi-SIM UE, in accordance with various aspects of the present disclosure. As shown in FIGS. 5A-5C, example(s) 500 include communication between a base station 110 and a UE 120. In some aspects, base station 110 and UE 120 may be included in a wireless network, such as wireless network 100. Base station 110 and UE 120 may communicate on a wireless access link, which may include an uplink and a downlink.

In some aspects, the UE 120 may be a multi-SIM UE that is capable of operating a plurality of wireless network subscriptions (e.g., SUB 1 and SUB 2), as described above in connection with FIG. 3. In some aspects, the base station 110 may provide a plurality of cells, where SUB 1 of the UE 120 may be provided via a first cell of the plurality of cells and SUB 2 of the UE 120 may be provided via a second cell of the plurality of cells. In some aspects, different base stations 110 provide the cells for SUB 1 and SUB 2 (e.g., a first base station 110 provides a first cell for SUB 1 and a second base station 110 provides a second cell for SUB 2).

In some aspects, the base station 110 may provide beam-based communication in the cell associated with SUB 1. For example, the base station 110 may operate the cell associated with SUB 1 on a 5G NR RAT or another type of beam-based RAT. In these examples, the base station 110 may provide a plurality of beams in the cell on which the UE 120 and the base station 110 may communicate. The UE 120 may be served by a serving beam of the plurality of beams. The remaining beams provided by the base station 110 in the cell may be referred to as neighbor beams of the serving beam. The neighbor beams may be spatially separated from the serving beam to provide spatial diversity in the cell. The UE 120 and the base station 110 may perform beam management in the cell associated with SUB 1 according to the example beam management procedures described above in connection with FIG. 4 and/or other beam management procedures. In some aspects, the base station 110 may also operate a beam-based RAT in cell associated with SUB 2, or may operate another type of RAT such as an LTE RAT or a W-CDMA RAT.

As shown in FIG. 5A, and by reference number 502, the UE 120 may transmit a first beam management report to the base station 110. The first beam management report may be associated with the serving beam of the UE and, in some examples, may be part of a beam management procedure. The first beam management report may include information associated with the serving beam, such as information identifying the serving beam, results of one or more measurements of the serving beam, and/or other types of serving beam information. The measurements of the serving beam may include measurements of reference signals transmitted on the serving beam (e.g., CSI-RSs, DMRSs, and/or other types of reference signals) and may include RSRP measurements of the serving beam, RSSI measurements of the serving beam, RSRP measurements of the serving beam, CQI measurements of the serving beam, and/or other types of measurements.

In some aspects, the base station 110 configures the UE 120 to transmit beam measurement reports for the serving beam. For example, the base station 110 may transmit an instruction to the UE 120 to perform the one or more measurements of the serving beam and to transmit the beam measurement reports to the base station 110 in a periodic manner or in an aperiodic manner. Accordingly, the UE 120 may transmit the first beam measurement report based at least in part on receiving the instruction and/or based at least in part on a periodicity indicated in the instruction.

In some aspects, the UE 120 performs the measurement(s) of the serving beam and transmits the first beam measurement report to the base station 110 based at least in part on mobility of the UE 120. For example, the UE 120 may perform the measurement(s) and transmit the first beam measurement report (e.g., including results of the measurement(s)) based at least in part on determining that the UE 120 is moving away from the spatial coverage area of the serving beam, based at least in part on determining that a speed of movement of UE 120 satisfies a threshold, based at least in part on determining that a displacement distance of the UE 120 satisfies a threshold, and/or based at least in part on other parameters.

In some aspects, the UE 120 performs the measurement(s) of the serving beam and transmits the first beam measurement report to the base station 110 based at least in part on determining that the results of the measurement(s) do not satisfy a threshold and/or based at least in part on determining that channel quality on the serving beam is worsening.

After transmitting the first beam measurement report to the base station 110, the UE 120 may initiate a timer. The timer may commence from the time at which the first beam measurement report was transmitted and may expire at a configured amount of time for the UE 120, which may be configured by the UE 120, the base station 110, or another wireless network entity. For example, the base station 110 may configure the UE 120 with a Periodic meas_report_TTT parameter that indicates the time duration of the timer. In some aspects, the time duration of the timer may be adjusted or modified by a multi-SIM parameter (MSIM_TTT_factor) which may be configured for different subscriptions of the UE 120. In these examples, the UE 120 may determine the time duration of the timer as Periodic meas_report_TTT*MSIM_TTT_factor.

As further shown in FIG. 5A, and by reference number 504, the UE 120 may determine that the timer (e.g., relative to transmission of the first beam measurement report) has expired. In particular, the UE 120 may determine that the timer has expired before any communication (e.g., a downlink communication such as a MAC-CE communication, an RRC communication, or a DCI communication) configuring beam measurements for one or more of the neighbor beams is received by the UE 120 from the base station 110.

As further shown in FIG. 5A, and by reference number 506, the UE 120 may perform a measurement of the one or more neighbor beams. For example, the UE 120 may perform one or more measurements of each of the neighbor beams. The one or more measurements include RSRP measurements, RSSI measurements, RSRQ measurements, CQI measurements, and/or other types of measurements of reference signals and/or SSBs transmitted on each of the neighbor beams.

The UE 120 may perform the measurements of the one or more neighbor beams based at least in part on determining that the timer has expired before any communication configuring beam measurements for one or more of the neighbor beams is received by the UE 120 from the base station 110. In some aspects, the UE 120 performs the measurement of the one or more neighbor beams based at least in part on determining that the timer has expired, in conjunction with other factors. For example, since the UE 120 expects the base station 110 to instruct the UE 120 to perform the measurement of the one or more neighbor beams because of poor or worsening channel conditions on the serving beam, the UE 120 may initiate the measurement of the neighbor beams based at least in part on determining that the measurement(s) of the serving beam do not satisfy a measurement threshold, in addition to not receiving the instruction during countdown of the timer. The measurement threshold may be configured by the UE 120, the base station 110, or another wireless network entity. For example, the base station 110 may configure the UE 120 with a min-servbeam_meas parameter that indicates the measurement threshold. In some aspects, the measurement threshold may be adjusted or modified by a multi-SIM parameter (MSIM_meas_factor) which may be configured for different subscriptions of the UE 120. In these examples, the UE 120 may determine the measurement threshold as min-servbeam_meas*MSIM_meas_factor.

As another example, the UE 120 may perform the measurements of the one or more neighbor beams based at least in part on determining that, during the countdown of the timer, a modem of the UE (e.g., implemented by receive processor 258, transmit processor 264, controller/processor 280, memory 282, and/or other components of the UE 120) switched to processing SUB 2 of the UE 120. In these examples, the UE 120 may initiate the measurement of the neighbor beams because the UE 120 was unable to monitor for the instruction from the base station 110 during the countdown of the timer to initiate the measurement of the one or more neighboring cells. In other words, the UE 120 may have missed the instruction from the base station 110 during the tune-away of the modem from SUB 1 to SUB 2 during the countdown of the timer. To mitigate the risk of the missed instruction, the UE 120 may initiate the measurement of the neighbor beams.

As further shown in FIG. 5A, and by reference number 508, the UE 120 may transmit a second beam measurement report to the base station 110. The second beam measurement report may be associated with the one or more neighbor beams and may include the results of the measurements of the one or more neighbor beams. The UE 120 may transmit the second beam measurement report to the base station 110 after performing the measurements of the one or more neighbor beams.

As shown in FIG. 5B, and by reference number 510, the base station 110 may receive the report and may transmit an indication to the UE 120 to perform a beam switch procedure based at least in part on the second beam measurement report. The indication may be an indication to switch from the serving beam to a neighbor beam of the one or more neighbor beams indicated in the second beam measurement report. In some aspects, the base station 110 may identify the neighbor beam based at least in part on the measurement for the neighbor beam (e.g., as indicated in the second measurement report) satisfying a measurement threshold, based at least in part on the measurement of the neighbor beam being the best or highest measurement among the one or more neighbor beams, and/or based at least in part on other factors.

As further shown in FIG. 5B, and by reference number 512, the UE 120 may receive the indication to perform the beam switch procedure and may initiate the beam switch procedure based at least in part on receiving the indication. In this way, the UE 120 is enabled to switch to another beam of the base station 110 before experiencing a radio link failure on the serving beam.

To initiate the beam switch procedure, the UE 120 may initiate a RACH procedure with the base station 110 on the neighbor beam to establish a communication link with the base station 110 via the neighbor beam. To initiate the RACH procedure, the UE 120 may transmit a RACH preamble and a RACH payload to the base station 110. In some aspects, the RACH preamble and the RACH payload may be included in separate communications. For example, the RACH preamble may be included in a message 1 (Msg1) communication and the RACH payload may be included in a message 3 (Msg3) communication (which may also be referred to as an RRC connection request). In some aspects, the RACH preamble and the RACH payload may be included in the same communication, which may be referred to as a message A (MsgA) communication. In some aspects, the RACH procedure may be part of a beam failure recovery (BFR) procedure.

In some aspects, the UE 120 initiates another timer after transmitting the second beam management report to the base station 110. The other timer may commence from the time at which the second beam measurement report was transmitted and may expire at a configured amount of time for the UE 120, which may be configured by the UE 120, the base station 110, or another wireless network entity. For example, the base station 110 may configure the UE 120 with a beamFailureDetectionTimer (or Beam Failure Detection timer) parameter that indicates the time duration of the other timer. In some aspects, the time duration of the other timer may be adjusted or modified by a multi-SIM parameter (MSIM_outofsync_factor) which may be configured for different subscriptions of the UE 120. In these examples, the UE 120 may determine the time duration of the timer as Periodic beamFailureDetectionTimer *MSIM_outofsync_factor.

During countdown of the other timer, the UE 120 and the base station 110 may be considered to be out of sync on the serving beam. The UE 120 may count the quantity of beam failure instances during countdown of the other timer. The counter parameter may be referred to as BFI_COUNTER and may be tracked by a MAC layer of the UE 120. Each beam failure instance may refer to an indication of a beam failure received at the MAC layer from lower layers of the UE 120 (e.g., the physical layer). The UE 120 may increment the counter for each beam failure instance received at the MAC layer.

As shown in FIG. 5C, and by reference number 514, if the UE 120 determines (e.g., based at least in part on the counter) that the quantity of beam failure instances received prior to expiration of the other timer satisfies a threshold (which may be indicated by a beamFailureInstanceMaxCount parameter), the UE 120 may determine that a beam failure on the serving beam has occurred. Accordingly, and as shown by reference number 516, the UE 120 may initiate a RACH procedure on a neighbor beam of the one or more neighbor beams indicated in the second beam measurement report to prevent a radio link failure from occurring and losing the connection with the base station 110. The UE 120 may identify the neighbor beam based at least in part on the measurement for the neighbor beam (e.g., as indicated in the second measurement report) satisfying a measurement threshold, based at least in part on the measurement of the neighbor beam being the best or highest measurement among the one or more neighbor beams, and/or based at least in part on other factors. In some aspects, the RACH procedure may be part of a BFR procedure.

In this way, the UE 120 may transmit the second beam measurement report to the base station 110 for the measurement of the one or more neighbor beams even in cases where the UE 120 misses or cannot receive the indication to perform the measurement. This enables the base station 110 to identify a neighbor beam of the UE 120 to which to switch from the serving beam to increase channel quality on the first subscription and/or to reduce the likelihood of a radio link failure for the first subscription. Moreover, the UE 120 is enabled to automatically switch to a neighbor beam of the one or more neighbor beams if the UE 120 does not receive a response from the base station 110 after transmitting the measurement report for the one or more neighbor beams, which further reduces the likelihood of a radio link failure for the first subscription.

As indicated above, FIG. 5 is provided as an example. Other examples may differ from what is described with respect to FIG. 5.

FIG. 6 is a diagram illustrating an example process 600 performed, for example, by a UE, in accordance with various aspects of the present disclosure. Example process 600 is an example where the UE (e.g., UE 120) performs operations associated with beam switching for a multi-SIM UE.

As shown in FIG. 6, in some aspects, process 600 may include transmitting, to a base station, a beam measurement report associated with a serving beam of the UE (block 610). For example, the UE (e.g., using transmission component 704, depicted in FIG. 7) may transmit, to a base station, a beam measurement report associated with a serving beam of the UE, as described above.

As further shown in FIG. 6, in some aspects, process 600 may include determining that a timer, relative to transmission of the beam measurement report, has expired (block 620). For example, the UE (e.g., using determination component 708, depicted in FIG. 7) may determine that a timer, relative to transmission of the beam measurement report, has expired, as described above.

As further shown in FIG. 6, in some aspects, process 600 may include performing a measurement of one or more neighbor beams based at least in part on determining that the timer has expired (block 630). For example, the UE (e.g., using measurement component 710, depicted in FIG. 7) may perform a measurement of one or more neighbor beams based at least in part on determining that the timer has expired, as described above.

Process 600 may include additional aspects, such as any single aspect or any combination of aspects described below and/or in connection with one or more other processes described elsewhere herein.

In a first aspect, transmitting the beam measurement report comprises transmitting the beam measurement report based at least in part on mobility of the UE. In a second aspect, alone or in combination with the first aspect, determining that the timer has expired comprises determining, after transmitting the beam measurement report, that the timer has expired before any communication configuring beam measurements for the one or more neighbor beams is received from the base station.

In a third aspect, alone or in combination with one or more of the first and second aspects, the UE is a multi-SIM device, wherein the serving beam and the one or more neighbor beams are associated with a first subscription of the UE, and wherein determining that the timer has expired comprises determining that, during a countdown of the timer, a modem of the UE switched to processing a second subscription of the UE. In a fourth aspect, alone or in combination with one or more of the first through third aspects, process 600 includes determining (e.g., using determination component 708, depicted in FIG. 7) that a measurement of the serving beam does not satisfy a measurement threshold, and performing the measurement of the one or more neighbor beams comprises performing the measurement of the one or more neighbor beams based at least in part on determining that the measurement of the serving beam does not satisfy the measurement threshold.

In a fifth aspect, alone or in combination with one or more of the first through fourth aspects, process 600 includes transmitting (e.g., using transmission component 704, depicted in FIG. 7) another beam measurement report to the base station, wherein the other beam measurement report is associated with the measurement of the one or more neighbor beams, determining (e.g., using determination component 708, depicted in FIG. 7) that a quantity of beam failure instances on the serving beam satisfies a threshold prior to expiration of another timer relative to transmission of the other beam measurement report, and initiating (e.g., using RACH component 712, depicted in FIG. 7) a RACH procedure on a neighbor beam of the one or more neighbor beams based at least in part on determining that the quantity of beam failure instances satisfies the threshold.

In a sixth aspect, alone or in combination with one or more of the first through fifth aspects, the other timer is associated with the UE and the base station being out of sync on the serving beam. In a seventh aspect, alone or in combination with one or more of the first through sixth aspects, determining that the other timer has expired comprises determining, after transmitting the other beam measurement report, that the other timer has expired before any communication associated with a beam switch procedure for the UE is received from the base station.

In an eighth aspect, alone or in combination with one or more of the first through seventh aspects, process 600 includes transmitting (e.g., using transmission component 704, depicted in FIG. 7) another beam measurement report to the base station, wherein the other beam measurement report is associated with the measurement of the one or more neighbor beams, and receiving (e.g., using reception component 702, depicted in FIG. 7), from the base station and based at least in part on transmitting the other beam measurement report, an indication to perform a beam switch procedure to switch from the serving beam to a neighbor beam of the one or more neighbor beams.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
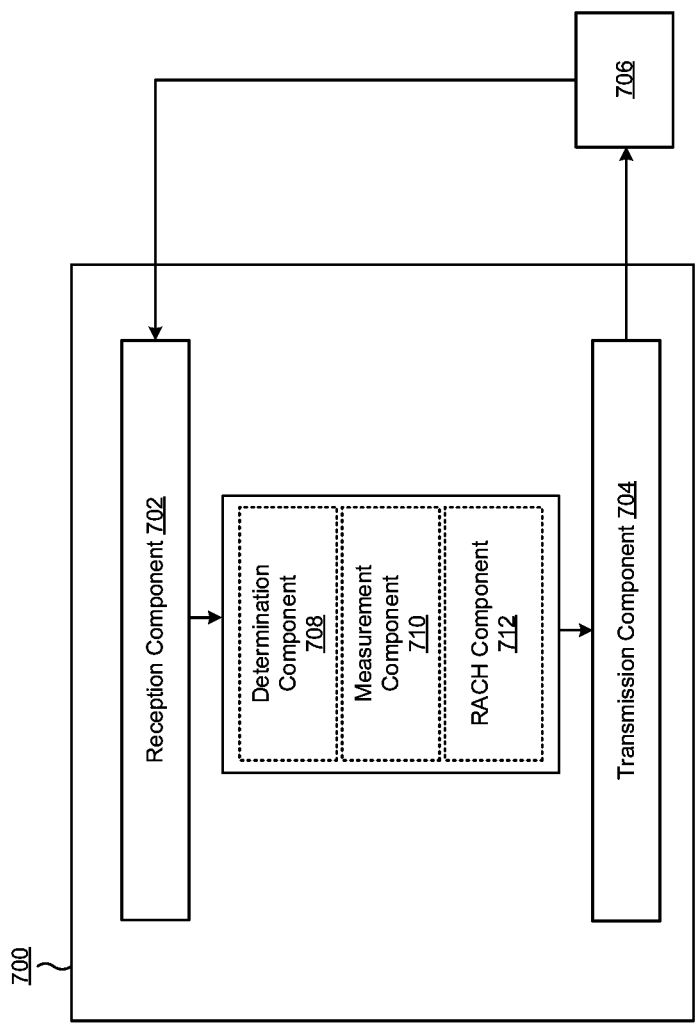
FIG. 7 is a block diagram of an example apparatus for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708, a measurement component 710, or a RACH component 712, among other examples.

In some aspects, the apparatus 700 may be configured to perform one or more operations described herein in connection with FIGS. 5A-5C. Additionally or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The transmission component 704 may transmit, to a base station, a beam measurement report associated with a serving beam of the apparatus 700. The determination component 708 may determine that a timer, relative to transmission of the beam measurement report, has expired. In some aspects, the determination component 708 may include a receive processor, a transmit processor, a controller/processor, a memory, or a combination thereof, of the UE described above in connection with FIG. 2. The measurement component 710 may perform a measurement of one or more neighbor beams based at least in part on determining that the timer has expired. In some aspects, the measurement component 710 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 708 may determine that a measurement of the serving beam does not satisfy a measurement threshold. The measurement component 710 may perform the measurement of the one or more neighbor beams based at least in part on the determination component 708 determining that the measurement of the serving beam does not satisfy the measurement threshold.

The transmission component 704 may transmit another beam measurement report to the base station wherein the other beam measurement report is associated with the measurement of the one or more neighbor beams. The determination component 708 may determine that a quantity of beam failure instances on the serving beam satisfies a threshold prior to expiration of another timer relative to transmission of the other beam measurement report. The RACH component 712 may initiate a RACH procedure on a neighbor beam of the one or more neighbor beams based at least in part on the determination of determination component 708. In some aspects, the RACH component 712 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 704 may transmit another beam measurement report to the base station, wherein the other beam measurement report is associated with the measurement of the one or more neighbor beams. The reception component 702 may receive, from the base station and based at least in part on transmitting the other beam measurement report, an indication to perform a beam switch procedure to switch from the serving beam to a neighbor beam of the one or more neighbor beams.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a base station, a beam measurement report associated with a serving beam of the UE, the UE comprising a multi-subscriber identification module (multi-SIM) device, and the serving beam and one or more neighbor beams are associated with a first subscription of the UE;
   determining that, during a countdown of a timer, relative to transmission of the beam measurement report, a modem of the UE switches to processing a second subscription of the UE;
   determining, after transmitting the beam measurement report and prior to receiving, from the base station, any communication configuring beam measurements for the one or more neighbor beams, that the timer has expired; and
   performing a measurement of the one or more neighbor beams based at least in part on determining that the timer has expired.

2. The method of claim 1, wherein transmitting the beam measurement report comprises:
   transmitting the beam measurement report based at least in part on mobility of the UE.

3. The method of claim 1, further comprising:
  determining that a measurement of the serving beam does not satisfy a measurement threshold; and
  wherein performing the measurement of the one or more neighbor beams comprises:
    performing the measurement of the one or more neighbor beams based at least in part on determining that the measurement of the serving beam does not satisfy the measurement threshold.

4. The method of claim 1, further comprising:
  transmitting another beam measurement report to the base station,
    wherein the other beam measurement report is associated with the measurement of the one or more neighbor beams;
  determining that a quantity of beam failure instances on the serving beam satisfies a threshold prior to expiration of another timer relative to transmission of the other beam measurement report; and
  initiating a random access channel (RACH) procedure on a neighbor beam of the one or more neighbor beams based at least in part on determining that the quantity of beam failure instances satisfies the threshold.

5. The method of claim 4, wherein the other timer is associated with the UE and the base station being out of sync on the serving beam.

6. The method of claim 4, wherein determining that the other timer has expired comprises:
  determining, after transmitting the other beam measurement report, that the other timer has expired before any communication associated with a beam switch procedure for the UE is received from the base station.

7. The method of claim 1, further comprising:
  transmitting another beam measurement report to the base station,
    wherein the other beam measurement report is associated with the measurement of the one or more neighbor beams; and
  receiving, from the base station and based at least in part on transmitting the other beam measurement report, an indication to perform a beam switch procedure to switch from the serving beam to a neighbor beam of the one or more neighbor beams.

8. A user equipment (UE) for wireless communication, comprising:
  a memory; and
  one or more processors coupled to the memory, the one or more processors configured to:
    transmit, to a base station, a beam measurement report associated with a serving beam of the UE, the UE comprising a multi-subscriber identification module (multi-SIM) device, and the serving beam and one or more neighbor beams are associated with a first subscription of the UE;
    determine that, during a countdown of a timer, relative to transmission of the beam measurement report, a modem of the UE switches to processing a second subscription of the UE;
    determine, after transmitting the beam measurement report and prior to receiving, from the base station, any communication configuring beam measurements for the one or more neighbor beams, that the timer has expired; and
    perform a measurement of the one or more neighbor beams based at least in part on determining that the timer has expired.

9. The UE of claim 8, wherein the one or more processors, when transmitting the beam measurement report, are configured to:
  transmit the beam measurement report based at least in part on mobility of the UE.

10. The UE of claim 8, wherein the one or more processors are further configured to:
  determine that a measurement of the serving beam does not satisfy a measurement threshold; and
  wherein the one or more processors, when performing the measurement of the one or more neighbor beams, are configured to:
    perform the measurement of the one or more neighbor beams based at least in part on determining that the measurement of the serving beam does not satisfy the measurement threshold.

11. The UE of claim 8, wherein the one or more processors are further configured to:
  transmit another beam measurement report to the base station,
    wherein the other beam measurement report is associated with the measurement of the one or more neighbor beams;
  determine that a quantity of beam failure instances on the serving beam satisfies a threshold prior to expiration of another timer relative to transmission of the other beam measurement report; and
  initiate a random access channel (RACH) procedure on a neighbor beam of the one or more neighbor beams based at least in part on determining that the quantity of beam failure instances satisfies the threshold.

12. The UE of claim 11, wherein the other timer is associated with the UE and the base station being out of sync on the serving beam.

13. The UE of claim 11, wherein the one or more processors, when determining that the other timer has expired, are configured to:
  determine, after transmitting the other beam measurement report, that the other timer has expired before any communication associated with a beam switch procedure for the UE is received from the base station.

14. The UE of claim 8, wherein the one or more processors are further configured to:
  transmit another beam measurement report to the base station,
    wherein the other beam measurement report is associated with the measurement of the one or more neighbor beams; and
  receive, from the base station and based at least in part on transmitting the other beam measurement report, an indication to perform a beam switch procedure to switch from the serving beam to a neighbor beam of the one or more neighbor beams.

15. A non-transitory computer-readable medium storing a set of instructions for wireless communication, the set of instructions comprising:
  one or more instructions that, when executed by one or more processors of a user equipment (UE), cause the UE to:
    transmit, to a base station, a beam measurement report associated with a serving beam of the UE, the UE comprising a multi-subscriber identification module (multi-SIM) device, and the serving beam and one or more neighbor beams are associated with a first subscription of the UE;

determine that, during a countdown of a timer, relative to transmission of the beam measurement report, a modem of the UE switches to processing a second subscription of the UE;

determine, after transmitting the beam measurement report and prior to receiving, from the base station, any communication configuring beam measurements for the one or more neighbor beams, that the timer has expired; and perform a measurement of the one or more neighbor beams based at least in part on determining that the timer has expired.

16. The non-transitory computer-readable medium of claim 15, wherein the one or more instructions further cause the UE to:

determine that a measurement of the serving beam does not satisfy a measurement threshold; and wherein the one or more instructions, that cause the UE to perform the measurement of the one or more neighbor beams, cause the UE to:

perform the measurement of the one or more neighbor beams based at least in part on determining that the measurement of the serving beam does not satisfy the measurement threshold.

17. The non-transitory computer-readable medium of claim 15, wherein the one or more instructions further cause the UE to:

transmit another beam measurement report to the base station, wherein the other beam measurement report is associated with the measurement of the one or more neighbor beams;

determine that a quantity of beam failure instances on the serving beam satisfies a threshold prior to expiration of another timer relative to transmission of the other beam measurement report; and initiate a random access channel (RACH) procedure on a neighbor beam of the one or more neighbor beams based at least in part on determining that the quantity of beam failure instances satisfies the threshold.

18. The non-transitory computer-readable medium of claim 15, wherein the one or more instructions further cause the UE to:

transmit another beam measurement report to the base station, wherein the other beam measurement report is associated with the measurement of the one or more neighbor beams; and receive, from the base station and based at least in part on transmitting the other beam measurement report, an indication to perform a beam switch procedure to switch from the serving beam to a neighbor beam of the one or more neighbor beams.

19. An apparatus for wireless communication, comprising:

means for transmitting, to a base station, a beam measurement report associated with a serving beam of the apparatus, the apparatus comprising a multi-subscriber identification module (multi-SIM) device, and the serving beam and one or more neighbor beams are associated with a first subscription of the apparatus;

means for determining that, during a countdown of a timer, relative to transmission of the beam measurement report, a modem of the apparatus switches to processing a second subscription of the apparatus;

means for determining, after transmitting the beam measurement report and prior to receiving, from the base station, any communication configuring beam measurements for the one or more neighbor beams, that the timer has expired; and means for performing a measurement of the one or more neighbor beams based at least in part on determining that the timer has expired.

20. The apparatus of claim 19, wherein the means for transmitting the beam measurement report comprises:

means for transmitting the beam measurement report based at least in part on mobility of the apparatus.

21. The apparatus of claim 19, further comprising:

means for determining that a measurement of the serving beam does not satisfy a measurement threshold; and wherein the means for performing the measurement of the one or more neighbor beams comprises:

means for performing the measurement of the one or more neighbor beams based at least in part on determining that the measurement of the serving beam does not satisfy the measurement threshold.

22. The apparatus of claim 19, further comprising:

means for transmitting another beam measurement report to the base station, wherein the other beam measurement report is associated with the measurement of the one or more neighbor beams;

means for determining that a quantity of beam failure instances on the serving beam satisfies a threshold prior to expiration of another timer relative to transmission of the other beam measurement report; and means for initiating a random access channel (RACH) procedure on a neighbor beam of the one or more neighbor beams based at least in part on determining that the quantity of beam failure instances satisfies the threshold.

23. The apparatus of claim 22, wherein the other timer is associated with the apparatus and the base station being out of sync on the serving beam.

24. The apparatus of claim 22, wherein the means for determining that the other timer has expired comprises:

means for determining, after transmitting the other beam measurement report, that the other timer has expired before any communication associated with a beam switch procedure for the apparatus is received from the base station.

25. The method of claim 1, further comprising:

transmitting another beam measurement report to the base station, wherein the other beam measurement report is associated with the measurement of the one or more neighbor beams; and switching to a neighbor beam, of the one or more neighbor beams, based at least in part on determining that a response to the other beam measurement is not received from the base station.

26. The UE of claim 8, wherein the one or more processors are further configured to:

transmit another beam measurement report to the base station, wherein the other beam measurement report is associated with the measurement of the one or more neighbor beams; and switch to a neighbor beam, of the one or more neighbor beams, based at least in part on determining that a response to the other beam measurement is not received from the base station.

27. The non-transitory computer-readable medium of claim 15, wherein the one or more instructions that cause the UE to transmit the beam measurement report, further cause the UE to:
  transmit the beam measurement report based at least in part on a mobility of the UE.

28. The non-transitory computer-readable medium of claim 16, wherein the other timer is associated with the UE and the base station being out of sync on the serving beam.

29. The non-transitory computer-readable medium of claim 16, wherein the one or more instructions that cause the UE to determine that the other timer has expired, further cause the UE to:
  determine, after transmitting the other beam measurement report, that the other timer has expired before any communication associated with a beam switch procedure for the UE is received from the base station.

30. The apparatus of claim 19, further comprising:
  means for transmitting another beam measurement report to the base station,
    wherein the other beam measurement report is associated with the measurement of the one or more neighbor beams; and
  means for receiving, from the base station and based at least in part on transmitting the other beam measurement report, an indication to perform a beam switch procedure to switch from the serving beam to a neighbor beam of the one or more neighbor beams.

* * * * *